(12) United States Patent
Rouaud et al.

(10) Patent No.: US 9,383,222 B2
(45) Date of Patent: Jul. 5, 2016

(54) METHODS AND SYSTEMS FOR PREVENTION OF DATA CORRUPTION

(75) Inventors: Didier Gilbert Rouaud, Kennesaw, GA (US); Ajay Hanumantrao Koliwad, Oreland, PA (US)

(73) Assignee: General Electric Company, Schenectady, NY (US)

(*) Notice: Subject to any disclaimer, the term of this patent is extended or adjusted under 35 U.S.C. 154(b) by 633 days.

(21) Appl. No.: 13/562,094

(22) Filed: Jul. 30, 2012

(65) Prior Publication Data

US 2014/0005964 A1    Jan. 2, 2014

Related U.S. Application Data

(60) Provisional application No. 61/666,711, filed on Jun. 29, 2012.

(51) Int. Cl.
*G01R 21/133*    (2006.01)
*G01D 4/00*    (2006.01)

(52) U.S. Cl.
CPC ............... *G01D 4/00* (2013.01); *Y02B 90/245* (2013.01); *Y04S 20/40* (2013.01)

(58) Field of Classification Search
CPC .............................. H04W 52/283; H04Q 9/00
USPC ............................. 702/61; 340/870.1, 870.03
See application file for complete search history.

(56) References Cited

U.S. PATENT DOCUMENTS 6,262,672 B1 * 7/2001 Brooksby et al. ......... 340/870.1
8,248,269 B1 * 8/2012 Boyd et al. ............... 340/870.03
2013/0293219 A1 * 11/2013 Ramirez et al. ........... 324/103 R

OTHER PUBLICATIONS

SGM1100™; IEC® Smart Energy Meter; PRIME™ PLC Meter to Power the Smart Grid; GE Energy; Digital Energy; 2012; 4 pages.

* cited by examiner

*Primary Examiner* — Lam Nguyen
(74) *Attorney, Agent, or Firm* — Sutherland Asbill & Brennan LLP (57) ABSTRACT

A utility meter includes an energy storage device configured to store energy to run the utility meter after a primary source of energy to the utility meter is unable to provide sufficient energy to run the utility meter. The utility meter includes a processor configured to determine utility usage data associated with a utility consumer, monitor an energy level of the energy storage device, and save the utility usage data, a reduced set of the utility usage data, or both, depending on the energy level of the energy storage device, and at least one data storage device configured to store the utility usage data, the reduced set of the utility usage data, or both.

19 Claims, 6 Drawing Sheets

METHODS AND SYSTEMS FOR PREVENTION OF DATA CORRUPTION

CROSS-REFERENCE TO RELATED APPLICATIONS

This application claims the benefit of U.S. patent application Ser. No. 61/666,711 filed on Jun. 29, 2012, the disclosure of which is incorporated herein by reference as set forth in full.

BACKGROUND

The invention relates generally to utility meters, and more particularly to methods and systems for the prevention of data corruption in utility meters.

Infrastructure, such as a smart grid, includes a variety of systems and components with sensors and memory devices to store sensed data. In the smart grid example, systems may include power generation systems, power transmission systems, smart meters, digital communications systems, control systems, and their related components. Certain smart meters include various sensors and memory devices to store sensed data. Unfortunately, the smart meters and their memory devices may be susceptible to data corruption when power is lost unexpectedly.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

A utility meter includes an energy storage device configured to store energy to run the utility meter after a primary source of energy to the utility meter is unable to provide sufficient energy to run the utility meter. The utility meter includes a processor configured to determine utility usage data associated with a utility consumer, monitor an energy level of the energy storage device, and save the utility usage data, a reduced set of the utility usage data, or both, depending on the energy level of the energy storage device, and at least one data storage device configured to store the utility usage data, the reduced set of the utility usage data, or both.

A non-transitory computer-readable medium having code stored thereon executable by a processor is provided, wherein the code includes instructions to collect utility usage data, and monitor an energy level of an energy storage device. The energy storage device is configured to provide energy to operate the processor, save a first set of the utility usage data incrementally and periodically when the energy level exceeds a first threshold, and save an incremental set of the utility usage data when the energy level falls beneath a second threshold, wherein the incremental set of the utility usage data comprises a reduced set of the utility usage data, and wherein the incremental set of the utility usage data is configured to enable a reconstruction of the utility usage data by combining the saved incremental set and the saved first set of the utility usage data.

A method includes receiving utility data in a utility meter, and monitoring an energy level of an energy storage device using the utility meter. The energy storage device is configured to provide energy to operate at least some components of the utility meter. The method includes operating the utility meter in a power up mode when the energy level is above a threshold and operating the utility meter in a power down mode when the energy level is below a second threshold. Operating the utility meter in the power up mode includes occasionally performing an incremental save of a more detailed set of the utility data, and operating the utility meter in the power down mode includes performing an incremental save of a less detailed set of the utility data substantially immediately after the energy level falls below the second threshold.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the invention, the articles "a," "an," "the," and "said" are intended to mean that there are one or more of the elements. The terms "comprising," "including," and "having" are intended to be inclusive and mean that there may be additional elements other than the listed elements.

Certain infrastructure, such as an electric smart grid, may include a variety of interconnected systems and components. For example, the smart grid may include power generation systems, power transmission and distribution systems, metering systems, digital communications systems, control systems, and their related components. Smart meters incorporate many functionalities relating to the consumption of utilities, such as water, electricity, gas, and so forth. For example, smart meters may enable a utility provider, such as an electricity provider, to remotely monitor consumer use of the utility (e.g., water, electricity, gas, and so forth), as well as any production of a utility a consumer may generate or produce. The smart power meter may register and store the utility usage and/or generation data in a programmable memory. Unfortunately, because the smart power meters may be subject to operating conditions that include, for example, unforeseen power interruptions, electrical noise transients, frequent switching, and so forth, data stored in the programmable memory (e.g., nonvolatile memory) may be susceptible to data corruption. Most generally, conditions that lead to data corruption in smart power meters often transpire during the powering down (de-energizing) of the meter.

Accordingly, present embodiments relate to a smart meter configured to operate in one or more of a power up mode and power down mode to prevent potential data corruption of saved utility data. Particularly, in the power up mode, the level of storage energy of an auxiliary charge circuit is monitored to ensure, before attempting a utility data save cycle, that the meter has sufficient energy to complete an uninterrupted save. Should the level of storage energy decrease below a predetermined threshold, the meter enters the power down mode, and performs an emergency incremental save of the utility data to be combined with the last completed save cycle upon the next power up (e.g., energizing) of the meter. As used herein, "data corruption" may refer to errors or distortions in utility data that may occur as the utility data is processed, transmitted, loaded, saved, and so forth. Indeed, the techniques described herein may not be limited to smart power meters, but may also be extended to any utility meter such as gas meters, water meters, and the like.

Figure 1:
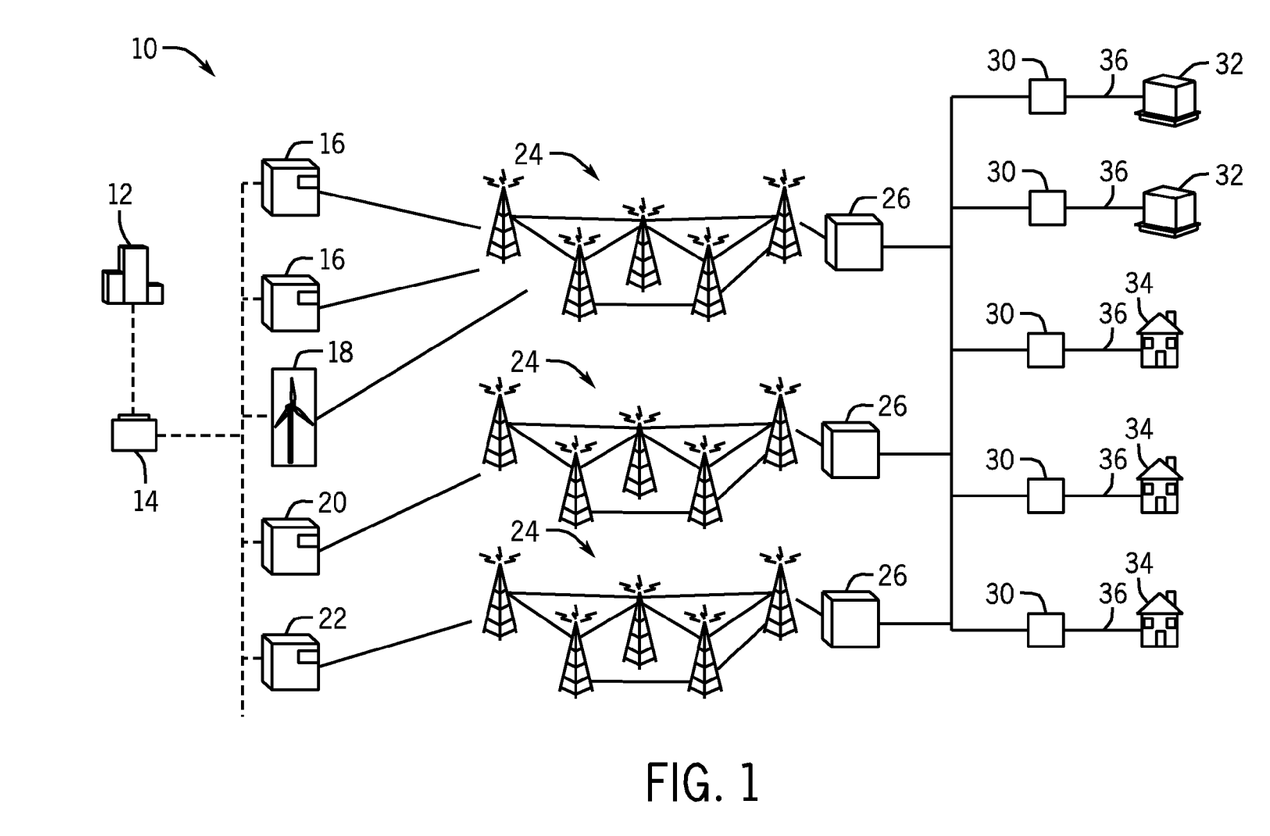
FIG. 1 is a block diagram of an embodiment of an intelligent generation, transmission, and distribution infrastructure (e.g., a smart grid infrastructure) system.

With the foregoing in mind, it may be useful to describe an embodiment of an infrastructure, such as an example smart grid system 10 illustrated in FIG. 1. It is to be noted that the systems and methods described herein may apply to a variety of infrastructure, including but not limited to power transmission and distribution infrastructure, gas delivery infrastructure, and various liquid (e.g., water) delivery infrastructure. As depicted, the smart grid system 10 may include one or more utilities 12. The utility 12 may provide for oversight operations of the smart grid system 10. For example, utility control centers 14 may monitor and direct power produced by one or more power generation stations 16 and alternative power generation stations 18. The power generation stations 16 may include conventional power generation stations, such as power generation stations using gas, coal, biomass, and other carbonaceous products for fuel. The alternative power generation stations 18 may include power generation stations using solar power, wind power, hydroelectric power, geothermal power, and other alternative sources of power (e.g., renewable energy) to produce electricity. Other infrastructure components may include a water power producing plant 20 and a geothermal power producing plant 22. For example, water power producing plants 20 may provide for hydroelectric power generation, and geothermal power producing plants 22 may provide for geothermal power generation.

The power generated by the power generation stations 16, 18, 20, and 22 may be transmitted through a power transmission grid 24. The power transmission grid 24 may cover a broad geographic region or regions, such as one or more municipalities, states, or countries. The power transmission grid 24 may also be a single phase alternating current (AC) system, but most generally may be a three-phase AC current system. As depicted, the power transmission grid 24 may include a series of towers to support a series of overhead electrical conductors in various configurations. For example, extreme high voltage (EHV) conductors may be arranged in a three conductor bundle, having a conductor for each of three phases. The power transmission grid 24 may support nominal system voltages in the ranges of 110 kilovolts (kV) to 765 kilovolts (kV). In the depicted embodiment, the power transmission grid 24 may be electrically coupled to power distribution substation and grid 26. Power distribution substation and grid 26 may include transformers to transform the voltage of the incoming power from a transmission voltage (e.g., 765 kV, 500 kV, 345 kV, or 138 kV) to primary (e.g., 13.8 kV or 4160V) and secondary (e.g., 480V, 240V, or 120V) distribution voltages. For example, industrial electric power consumers (e.g., production plants) may use a primary distribution voltage of 13.8 kV, while power delivered to commercial and residential consumers may be in the secondary distribution voltage range of 120V to 480V.

As again depicted in FIG. 1, the power transmission grid 24 and power distribution substation and grid 26 may be part of the smart grid system 10. Accordingly, the power transmission grid 24 and power distribution substation and grid 26 may include various digital and automated technologies to control power electronic equipment such as generators, switches, circuit breakers, reclosers, and so forth. The power transmission grid 24 and power distribution substation and grid 26 may also include various communications, monitoring, and recording devices such as, for example, programmable logic controllers (PLCs) and electric fault sensing protective relays. For example, during storms, a protective relay on power distribution substation and grid 26 may detect an electrical fault downstream of the substation, and operate a circuit breaker to allow the fault to clear and restore electric power. In certain embodiments, the power transmission grid 24 and power distribution substation and grid 26 may also deliver power and communicate data such as changes in electric load demand to a metering system 30.

In certain embodiments, the metering system 30 may be an advanced metering infrastructure (AMI) meter used to collect, measure, and analyze electric power usage and/or generation. The metering system 30 may be electrically and communicatively coupled to one or more of the components of the smart grid 10, including the power transmission grid 24, power distribution substation and grid 26, the commercial sites 32, and the residences 34 via source-side and load-side live and neutral conductors 36. Additionally, the metering system 30 may enable two-way communication between commercial sites 32, residences 34, and the utility control center 14, providing for a link between consumer behavior and electric power usage and/or generation. For example, the metering system 30 may track and account for pre-paid electricity in a similar fashion to pre-paid cell phone usage. Likewise, the utility's consumers (e.g., commercial sites 32, residences 34) may benefit from lower utility charges by optimizing their utility use, for example, to take advantage of lower rates during low demand hours. Washer/dryers, electric car chargers, and other flexible power consumption appliances may be programmed to operate during low demand hours, resulting in lower utility bills and a more balanced utilization of energy. As noted above, electric power may also be generated by the consumers (e.g., commercial sites 32, residences 34). For example, the consumers may interconnect a distributed generation (DG) resource (e.g., solar panels or wind turbines) to generate and deliver power to power distribution substation and grid 26.

As will be further appreciated, in certain embodiments, the metering system 30 may include a system of electrical and electronic components such as, for example, a display, one or more processors, memories and similar storage devices, sensors, tampering detectors, and so forth. It should also be appreciated that the metering system 30 may measure, calculate, store, and display an apparent power (kVA), real power (i.e., the total power consumed by the resistive component of a given load commercial sites 32, residences 34 over a time interval) (kW), and reactive power (i.e., the power consumed by the reactive component of a given load commercial sites 32, residences 34 over a time interval) (kVar) as a product of power and time. For example, electric utilities may report to consumers their usage and/or generation per kilowatt-hour (kWh) for billing and/or crediting purposes. In certain embodiments, the metering system 30 may also include an embedded subsystem, as will be discussed in greater detail with respect to FIG. 2, suitable for preventing data corruption of power usage and/or generation data registered and saved by the metering system 30.

Figure 2:
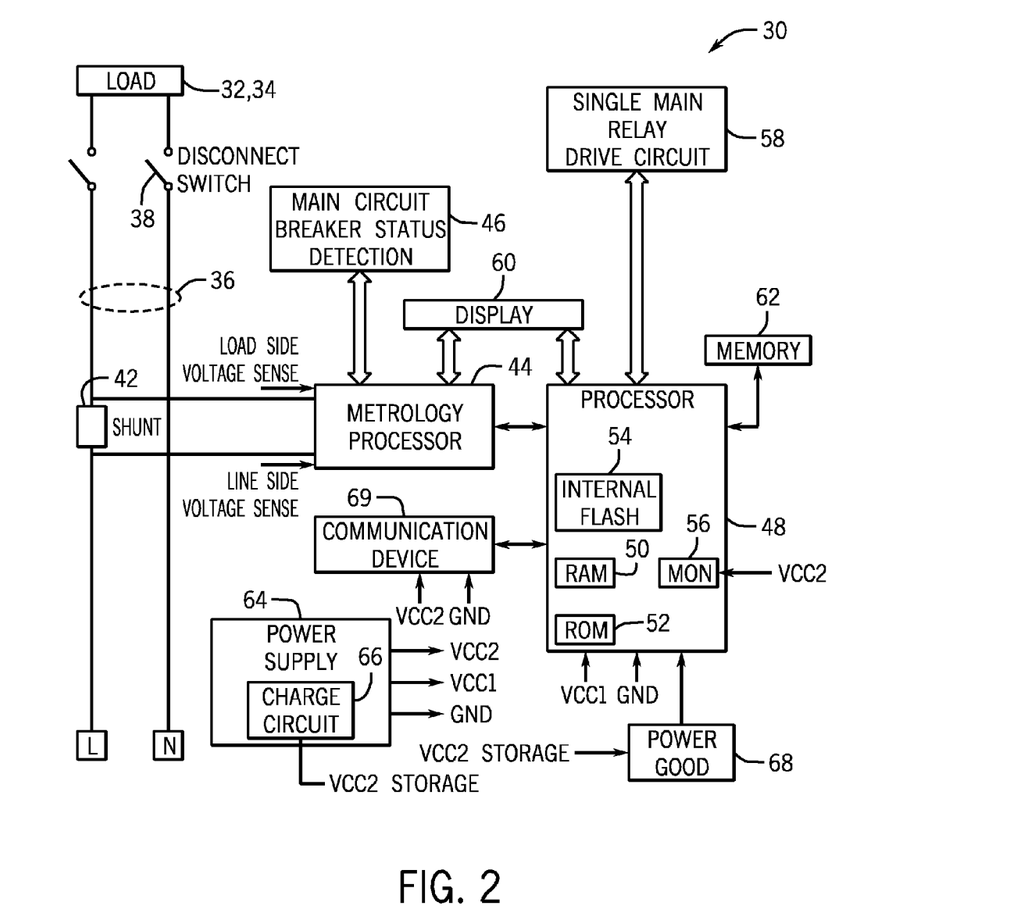
FIG. 2 is a block diagram of an embodiment of a smart power meter system included in the system of FIG. 1.

Accordingly, FIG. 2 is a schematic diagram of one embodiment of the metering system 30. Although illustrated in a single-phase configuration, it should be appreciated that the metering system 30 may also include a poly-phase (e.g., three-phase) configuration. As previously noted, the metering system 30 may be electrically and/or communicatively coupled via conductors 36 to load 32, 34 (e.g., commercial sites 32, residences 34) to monitor, compute, and store, for example, energy usage, energy generation, time keeping, and so forth of the load 32, 34. As illustrated, the conductors 36 may be coupled to the load 32, 34 through a disconnect switch 38. The disconnect switch 38 may be a switch to disconnect the load 32, 34 from the grid 26. Similarly, the disconnect switch 38 may be programmed to trip (e.g., operate), and disconnect the load 32, 34 from the grid 26. In such a case, for example, the consumers (e.g., commercial sites 32, residences 34) may elect to transfer or discontinue utility service. As will be further appreciated, when a loss of power (e.g., due to opening or tripping of the disconnect switch 38) is detected, the metering system 30 may enter into a power down mode to preclude the potential corruption of saved utility data.

In certain embodiments, the conductors 36 may also be electrically and/or communicatively coupled to a shunt resistor 42. The shunt resistor 42 may be a current sensor configured to detect current flowing through the conductors 36 for sensing and processing. It should be appreciated that the shunt resistor 42 is illustrated as one example of a current sensor, but may be any device (e.g., current transformer [CT], Hall Effect Sensor or Rogowski coil) that outputs a signal (e.g., AC/DC voltage or current) proportional to a detected electrical current flowing through the electrically and/or communicatively coupled conductors 36. For example, the metering system 30 may be a 240 VAC residential power meter. The shunt resistor 42 may continuously sense the current flowing through the conductors 36 and voltage across the conductors 36 to detect events such as electrical faults, decreases in current due to load changes, and so forth. The shunt resistor 42 may then output a signal proportional to the current detected flowing through the conductors 36 to one or more communicatively coupled processors for measurement and processing.

For example, in certain embodiments, the metering system 30 may include a metrology processor 44. The metrology processor 44, which may also be referred to as an analog front end (AFE), may include code or instructions stored in a non-transitory machine-readable medium and executed, for example, by the metrology processor 44. Particularly, the metrology processor 44, in time intervals or in real time, sample single or poly-phase current (A) and voltage (V) of the conductors 36. The metrology processor 44 may also include voltage reference circuitry, real time clocks, data converters, and similar electronic circuitry. In the depicted embodiment, raw data samples of nominal analog voltage inputs and analog current inputs sensed by the shunt resistor 42 may be referenced to a pre-configured reference voltage (e.g., 3.3-5 VDC) of the metrology processor 44 for measurement. For example, in data conversion (e.g., analog-to-digital conversion [ADC]), the voltage reference (e.g., 3.3 VDC) may act as a precise and accurate measurement benchmark, against which analog inputs (e.g., analog current inputs) may be compared. As a result, the metrology processor 44 may resolve each of the analog current inputs in a predefined voltage measurement range (e.g., −250 mVDC to +250 mVDC), such that the incoming raw data samples of analog current inputs may be both accurate and repeatable. The metrology processor 44 may also be communicatively coupled to a circuit breaker detector 46, which may further indicate whether or not, for example, a house circuit breaker is being cycled or the load 32, 34 is energized. In other embodiments, a circuit breaker detector 46 may receive communication from an application processor 48.

In certain embodiments, the raw samples of analog voltage and current input data measured and processed by the metrology processor 44 may be output to the core application processor 48 for the further computation and processing of power and/or energy data registered by the metering system 30. The application processor 48 may be operatively coupled to the metrology processor 44 to perform instructions for carrying out the presently disclosed techniques. These instructions may be encoded in programs or code stored in a tangible non-transitory computer-readable medium, such as a random access memory (RAM) 50, a read-only memory (ROM) 52, and/or other storage (e.g., FLASH). The application processor 48 may be a general purpose processor, application-specific integrated circuit (ASIC), system-on-chip (SoC), digital signal processor, or similar processing device. In one embodiment, the application processor 48 may also include an internal flash memory 54, which may be used to save interval increments of utility data. The application processor 48 may also include a monitoring device 56 (e.g., ADC) to monitor, for example, the level of storage energy of an auxiliary charge circuit of the metering system 30.

In certain embodiments, the application processor 48 may process and compute utility data received from the metrology processor 44, and by extension, the conductors 36. For example, the application processor 48 may, over time intervals (e.g., 15, 30, 45, 60, 120 minute duration) or in real time, compute single or poly-phase current (A), voltage (V), apparent power (kVA), real power (kW), reactive power (kVar), and power factor (e.g., the phase angle between the voltage and current), data, and report that data to the consumer 32, 34 and/or the utility. Particularly, the application processor 48 may perform a series of calculations to determine the amount of active power (kWh) and reactive power (kVARh) registered by the metering system 30. As illustrated, the application processor 48 may also couple to a relay drive circuit 58 to remotely control, for example, the opening or tripping of the disconnect switch 38.

As also depicted, the application processor 48, along with the metrology processor 44, may each be commutatively coupled to a display 60 to display electric power usage and/or generation in recorded time intervals or real time. For example, the display 60 may be a liquid crystal display (LCD) to display parameters such as real power consumption in kilowatt-hours (kWh), reactive power consumption in kilovar-hours (kVarh), current in amperes (A), voltage in volts (V), or some combination thereof. The display 60 may also display power (e.g., apparent, real, and reactive) delivered to the load 32, 34, from the utility 12, as well as power generated by the load 32, 34, to deliver to the grid 26.

In certain embodiments, the application processor 48 may also support one or more operating systems, as well as various embedded software and firmware applications. For example, the application processor 48 may support firmware and/or software instructions to operate the metering system 30 in a power up mode and a power down mode. Specifically, the "power up mode" may refer to a mode in which the conductors 36 are energized to deliver power to the load 32, 34, as well as deliver power to a power supply 64 and/or charge circuit 66, such that the metering system 30 may have sufficient energy to successfully perform a save of utility data, for example, to the internal flash 54 and/or a memory 62. As will be discussed in greater detail below, a save of utility data may include performing an incremental save of partial utility data (e.g., Emergency Save [E-Save]) followed by a save of a complete and detailed utility data (e.g., Full Save). On the other hand, the "power down mode" may refer to a mode in which the metering system 30 may lose its primary power supply (e.g., due to the de-energizing of conductors 36) and enter an emergency saving state to preclude a potential corruption of data while attempting to successfully save utility data, for example, to the internal flash 54 and/or the memory 62. As will be further appreciated, the determination to switch to the power down mode may be based on a predetermined energy level of the charge circuit 66, because the charge circuit 66 may become the primary source of energy to operate the embedded circuitry (e.g., metrology processor 44, application processor 48, memory 62, and so forth) when the metering system 30 enters the power down mode.

As noted above, the memory 62 may be used to store a full cycle (e.g., 15, 30, 45, 60, 120-minute duration) of utility data received by the metering system 30. Accordingly, the memory 62 may be a nonvolatile memory (e.g., electrically erasable programmable read-only memory [EEPROM], flash, etc.) configured to save and store processed utility data when the metering system 30 is energized, or de-energized due to a loss of power via the conductors 36. In some embodiments, the memory 62 may be susceptible to data corruption, as the primary source (e.g., power received via the conductors 36) may fail, for example, due to the disconnection of service, opening or tripping of the disconnect switch 38, and so forth. Accordingly, the metering system 30 may also include the auxiliary charge circuit 66 included within the power supply 64. As previously noted, the power supply 64 may be included to transform and/or rectify the incoming voltage (e.g., 240 VAC) to supply voltage levels VCC2 (e.g., 16 VDC), VCC1 (e.g., 3.3 VDC) and GND (e.g., ground) to operate the data processing and storage circuitry (e.g., metrology processor 44, application processor 48, memory 62, and so forth) of the metering system 30. The charge circuit 66 may include one or more storage devices (e.g., capacitors, super capacitors, batteries, and so forth) to store a "power good" level of energy, or the deterministic quantity or value of energy over a time interval to allow the metering system 30 to successfully save utility data, for example, to the internal flash 54 and/or the memory 62. Specifically, the energy of the storage device may be deterministic due to, for example, knowing the capacitance and the voltage of the energy storage device. In this way, the extractable energy may be determined analytically.

The metering system 30 may also include a power good circuit 68. The power good circuit 68 may be a supervisory circuit configured to track the voltage or energy level (e.g., TEST VCC2) of the charge circuit 66, and to provide a power good signal indicating to the application processor 48 that the metering system 30 has sufficient stored energy to complete a utility data save cycle. As also depicted, the metering system 30 may include a communication device 69 communicatively coupled between the conductors 36 and the application processor 48. In certain embodiments, the communication device 69 may be an AMI interface used to communicate in real time or near real time with the utility 12, for example, for the purposes of reporting saved utility usage, utility generation, or power outages of the metering system 30. The communication device 69 may also allow the metering system 30 to communicate saved power usage and/or generation to the consumers (e.g., commercial sites 32, residences 34) via a wireless protocol (e.g., ZigBee).

Figure 3:
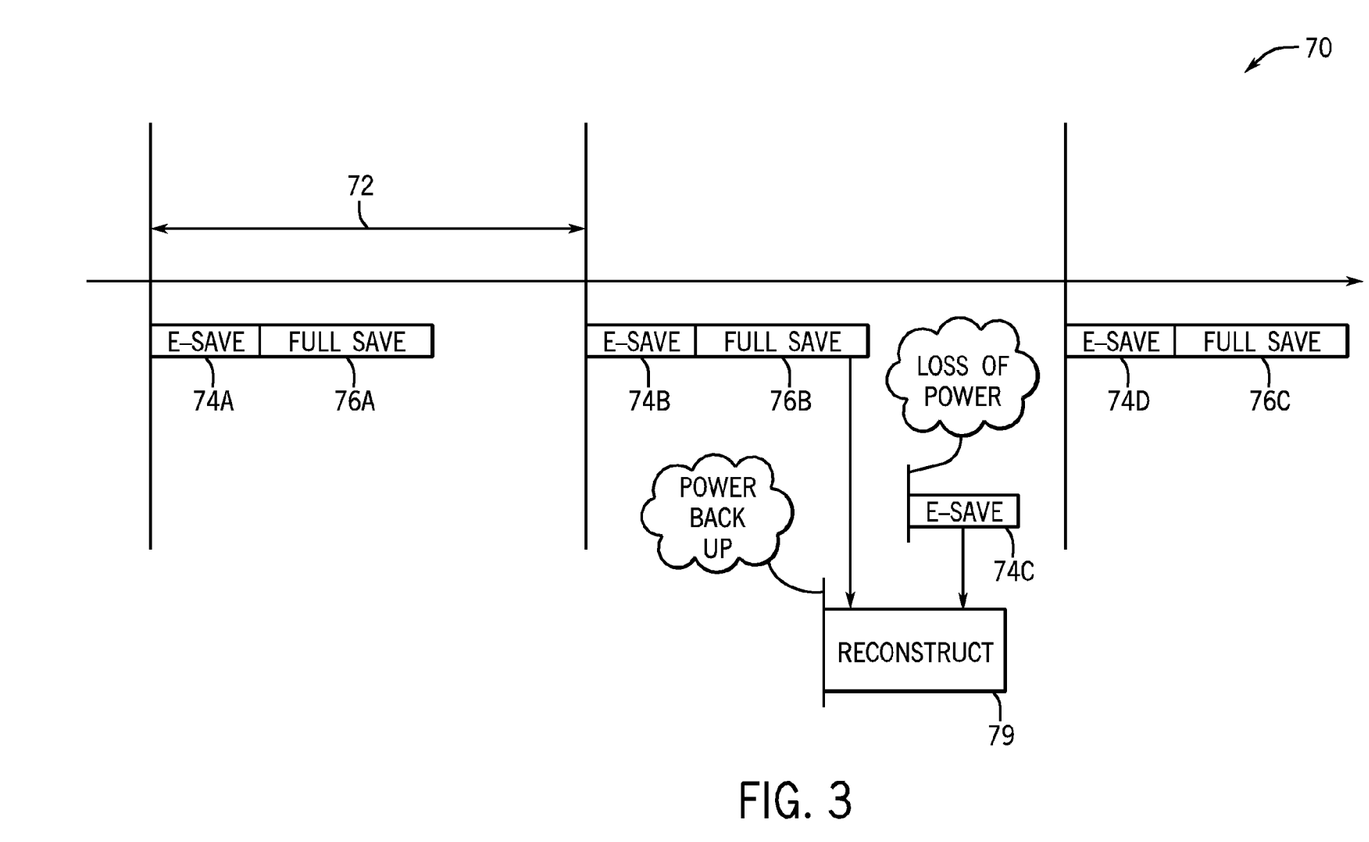
FIG. 3 is a diagram of an embodiment of a utility data save cycle in accordance with embodiments of the smart meter system of FIG. 2.

An example diagram 70 of one or more utility data save cycles is depicted in FIG. 3. As previously noted, in the power up mode, the metering system 30 may have sufficient energy to successfully perform a save cycle of utility data, for example, to the internal flash 54 and/or the memory 62. Accordingly, as illustrated, a save cycle including an incremental emergency save (E-Save 74A) (e.g., partial or an incremental set of utility data) followed by a full save (Full Save 76A) (e.g., detailed set of utility data) may be performed by the metering system 30 over a time interval 72. Specifically, it should be appreciated that the utility data saved via an emergency save may be a subset of the utility data saved via a full save. As will be further appreciated, in the power up mode, such a utility data save cycle may not commence until the application processor 48 receives the power good signal, ensuring that the metering system 30 has sufficient stored energy to complete an uninterrupted incremental save E-Save 74. As it may be worth noting, the save cycle in diagram 70 may include both the E-Save 74 and the Full Save 76 to ensure that a complete record of utility data may be recovered by combining the E-Save 74 with the Full Save 76 when the metering system 30 enters the power down mode. For example, as also illustrated in the diagram 70, should the metering system 30 lose primary power (e.g., due to de-energizing of the conductors 36), E-save 74C will be performed, or if in the middle of E-Save 74B, E-Save 74B will be completed. At subsequent power up (e.g., energizing), the metering system 30 will reconstruct 79 using Full Save 76A and E-Save 74C (or E-Save 74B if not completed). Upon a successful E-Save 74C (or E-Save 74B), reconstructed 79 save becomes the first full save cycle of the next save cycle interval (e.g., interval 72). In another embodiment, should the metering system 30 lose primary power while performing the Full Save 76B, for example, then the Full Save 76B is halted, and E-Save 74C is performed (or uses E-Save 74B if the Full Save 76B time, for example, is less than the integration time of the metrology processor 44). At subsequent power up, the metering system 30 will reconstruct 79 by combining Full Save 76A and E-Save 74C. Upon a successful E-Save 74C, the reconstructed 79 save becomes the first full save cycle of the next save cycle interval (e.g., interval 72). In at least one other embodiment, should the metering system 30 lose primary power after completing the Full Save 76B, E-Save 74C will be performed. At subsequent power up, the metering system 30 will reconstruct 79 by combining Full Save 76B and E-Save 74C. Upon a successful E-Save 74C, the reconstructed 79 save becomes the first full save cycle of the next save cycle interval (e.g., interval 72).

Figure 4:
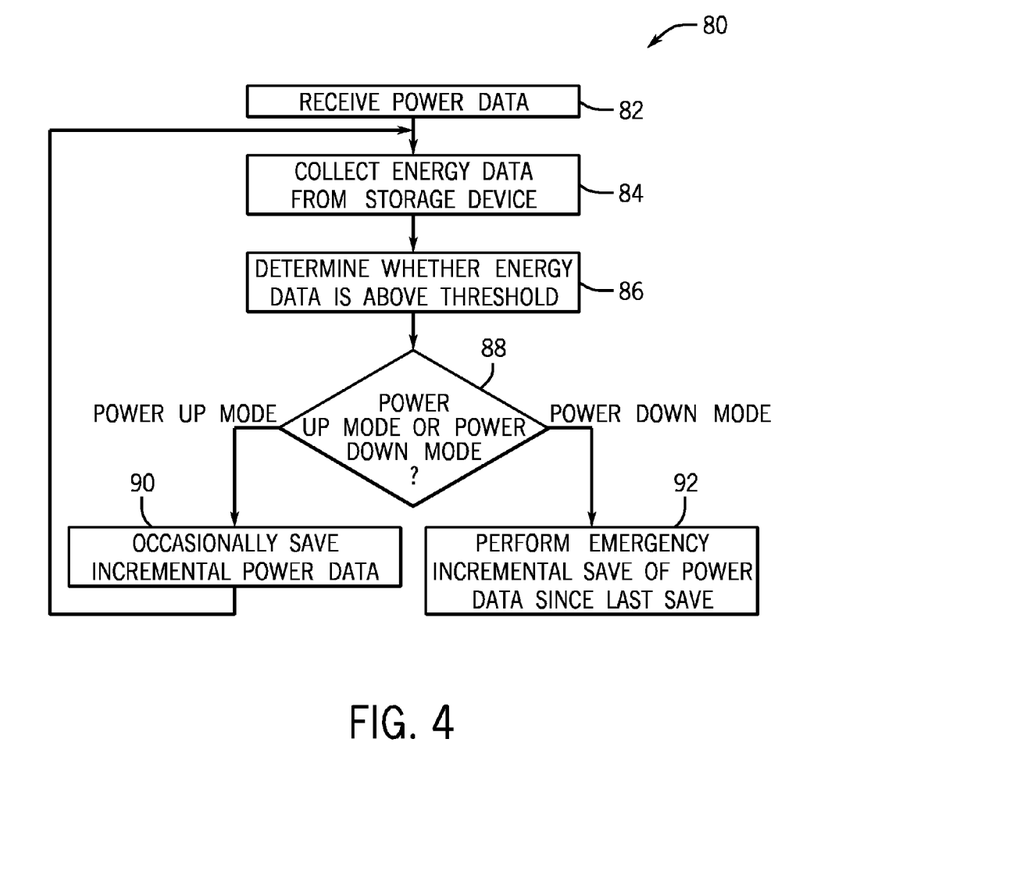
FIG. 4 is a flowchart of an embodiment of a process suitable for preventing a corruption of utility data measured and saved by the smart meter system of FIG. 2.
Figure 5:
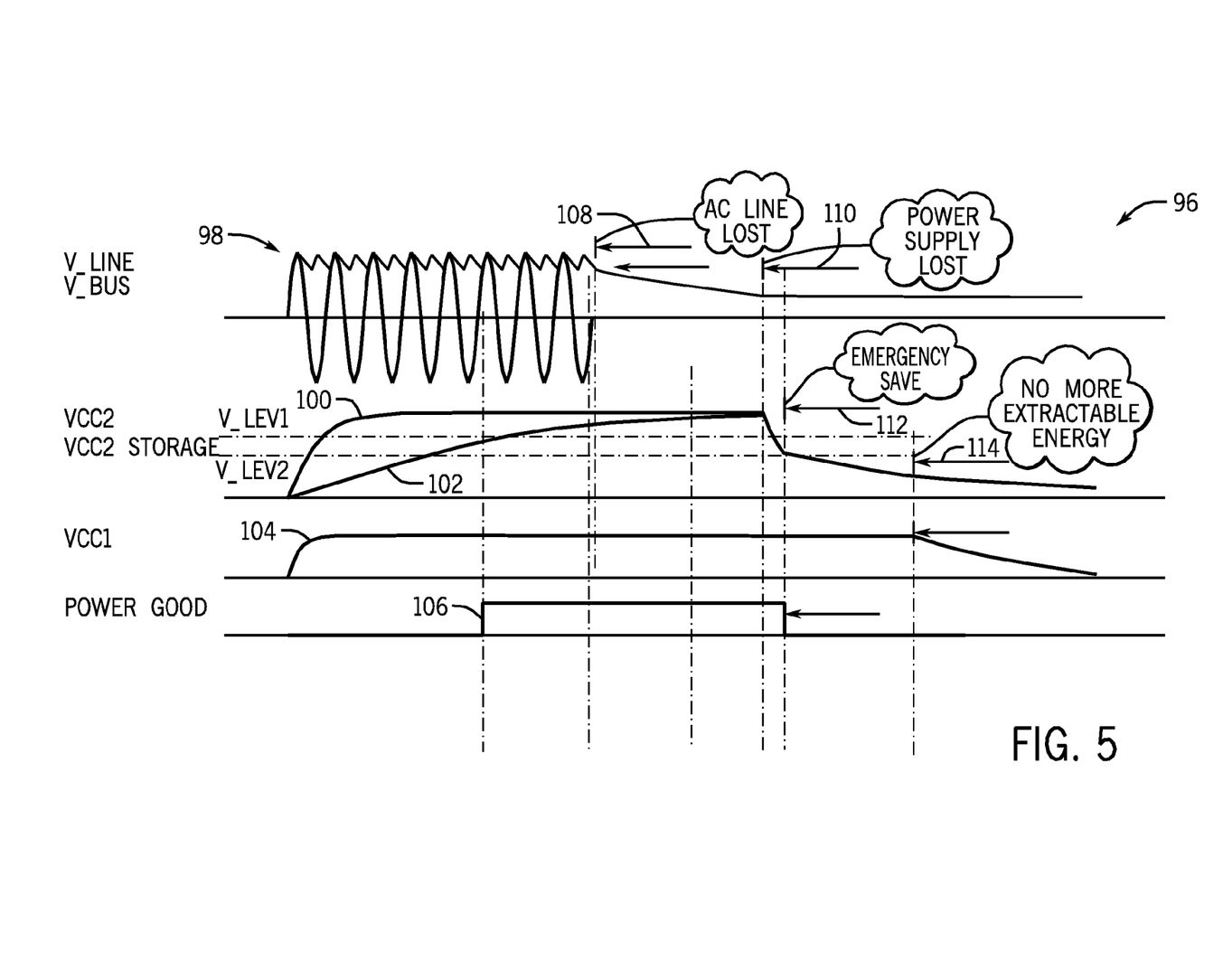
FIG. 5 is a timing diagram of an embodiment of a utility data save cycle in accordance with embodiments of the smart power meter system of FIG. 2.

Turning now to FIG. 4, a flow diagram is presented, illustrating an embodiment of a process 80 useful in preventing a corruption of utility data registered and saved by the metering system 30 depicted in FIG. 2. As previously noted, although discussed with respect to preventing a corruption of utility data, it should be appreciated that the process 80 may also be used to prevent a corruption of any utility data including, for example, preventing a corruption of electricity data, gas data, water data, and so forth. Further, for the purpose of illustration, the flow diagram of FIG. 4 will be discussed in conjunction with the timing diagram 96 of FIG. 5. The process 80 may include code or instructions stored in a non-transitory machine-readable medium (e.g., the RAM 50) and executed, for example, by the application processor 48. The metering system 30 may continuously or periodically perform the process 80 presented in FIG. 4 to regularly save utility data, for example, to the internal flash 54 and/or the memory 62. For example, the metering system 30 may periodically perform the process 80 during normal operating conditions (e.g., power up mode), but may continuously or periodically also perform the process 80 during times of unforeseen power service interruptions such as electrical faults (e.g., power down mode).

The process 80 may begin with the metering system 30 receiving (block 82 of FIG. 4) utility data. As noted above with respect to FIG. 2, the metrology processor 44 may, in time intervals or in real time, sample single or poly-phase analog current (A) and voltage (V) of the conductors 36. Similarly, the application processor 48 may receive the individual sampled analog current and voltage inputs, and compute a real power consumption in watt-hours (Wh) or in kilowatt-hours (kWh) and reactive power in var-hours (Varh) or in kilovar-hours (kVarh) to determine the power usage and/or generation of consumers (e.g., commercial sites 32, residences 34) and save that utility data at regular intervals. It should be appreciated that the time interval may be chosen to ensure that an E-Save captures any new utility data since the last completed save cycle. As depicted within the timing diagram 96 of FIG. 5, an AC voltage signal 98 may represent the line voltage (e.g., 240 VAC) of the conductors 36 used to power and/or charge the metering system 30, and more specifically, the power supply 64 and the charge circuit 66.

The process 80 may continue with the application processor 48 determining (block 84 of FIG. 4) an energy level from an energy storage device (e.g., charge circuit 66) of the metering system 30. As previously discussed, in the power up mode, the monitoring device 56 (e.g., ADC) of the application processor 48 monitors the level of storage energy of the charge circuit 66 to ensure, before attempting the save cycle, that the metering system 30 has sufficient energy to complete an incremental emergency save E-Save 74 of the utility data, for example, to the internal flash 54 and/or a memory 62. The application processor 48 of the metering system 30 may then determine (block 86 of FIG. 4) whether the energy data collected from the charge circuit 66 is above a predetermined threshold. For example, as again depicted within the timing diagram 96 of FIG. 5, energy signals 100 (e.g., VCC2) and 102 (e.g., VCC2 STORAGE) are monitored to remain above the lower threshold energy level V_LEV2, which may represent the storage energy required to complete a save cycle. This may also be indicated by a logical high interval of the power good signal 106. Similarly, the DC voltage signal 104 (e.g., VCC1) may represent the supply voltage (e.g., 3.3 VDC) required to operate the embedded circuitry (e.g., metrology processor 44, application processor 48, memory 62, and so forth) of the metering system 30.

Specifically, it should be appreciated that determining whether the energy level collected from the charge circuit 66 is above the upper threshold energy level V_LEV1 or below the lower threshold energy level V_LEV2, in fact, constitutes determining (decision 88 of FIG. 4) whether the metering system 30 is to operate in one or more of the power up mode or power down mode, respectively. For example, again referring to the timing diagram 96 of FIG. 5, if the energy signals 100 (e.g., VCC2) and 102 (e.g., VCC2 STORAGE) are above the lower threshold energy level V_LEV1 then the metering system 30 operates in the power up mode and occasionally (e.g., over approximately 1, 2, 5, 10, 15, 30, 45, 60, 120 minute duration of time) saves (block 90) incremental utility data, and repeats the process 80.

However, in certain embodiments, the metering system 30 may lose primary power (e.g., lose AC voltage signal 98) at a point in time 108. Subsequently, the main offline power supply may be lost at a point in time 110, which may also, as illustrated, correspond to the point in time the stored energy signal 100 (e.g., VCC2) and 102 (e.g., VCC2_STORAGE) begin to decrease due to, for example, a discharging of the charge circuit 66. At a point in time 112, which may represent the point in time the energy signals 100 (e.g., HV) and 102 (e.g., HV STORAGE) cross the lower threshold energy level V_LEV2, the metering system 30 may enter the power down mode, and perform (block 92) an emergency incremental save of the customer data which will be combined with the last completed save cycle at the next power up. Particularly, as discussed above with respect to FIG. 3, the metering system 30 may perform an emergency save (e.g., E-Save 74), such that the emergency save (e.g., E-Save 74) is completed before the charge circuit 66 discharges all of its extractable energy (at a point in time 114). Upon the next power up (e.g., energizing) of the metering system 30, a complete save cycle of utility data may be recovered or reconstructed by combining the emergency save (e.g., E-Save 74) with the last completed full save (e.g., Full Save 76). Further, should the metering system 30 enter the power down mode while in the process of performing a Full Save, then the Full Save is halted, and an emergency save completed. Upon powering up, a complete utility data is recovered or reconstructed by combining the last performed emergency save (e.g., E-Save 74) with the last completed full save (e.g., Full Save 76).

Figure 6:
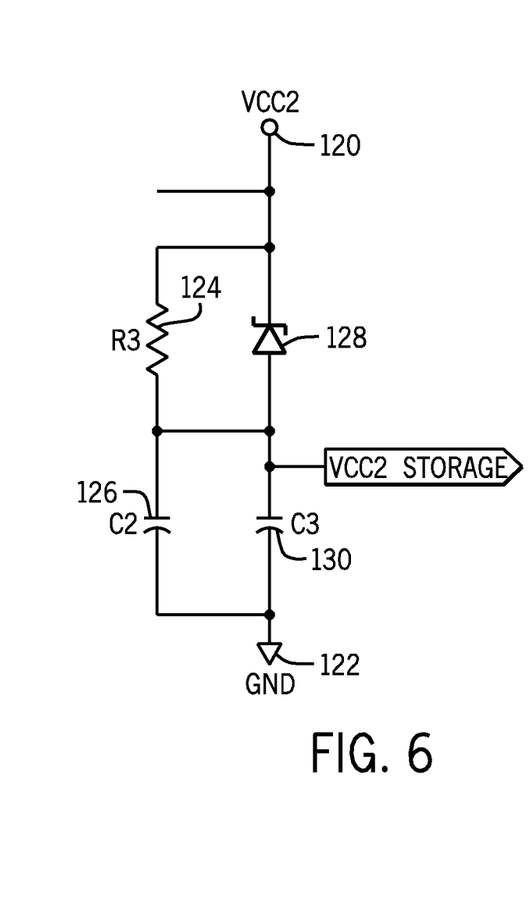
FIG. 6 is an example embodiment of a charge circuit included within the smart power meter system of FIG. 2.

FIG. 6 illustrates one embodiment of the charge circuit 66. As depicted, the charge circuit 66 may include power supply rails 120 (e.g., VCC2 STORAGE) and 122 (e.g., GND), a resistor 124, and a Shottky diode 128 electrically coupled to one or more capacitors 126 (e.g., C2) and 130 (e.g., C3). The power supply rail 120 (e.g., VCC2 STORAGE) may represent the supply voltage (e.g., 5-16 VDC) of the charge circuit 66, and may be determined based on the operating voltage of the embedded circuitry of the metering system 30. As depicted, the Shottky diode 128 may be configured in a reverse bias orientation to conduct current when discharging. Specifically, at power up (e.g., energizing), the storage elements (e.g., capacitors 126 and 130) are charged from the power supply rail 120 through resistor R3. When powering down (e.g., de-energizing), charge in the storage elements (e.g., capacitors 126 and 130) will transfer through the Shottky diode 128 and provide the required energy to the conversion circuit supplying the processors (e.g., processors 44 and 48).

Figure 7:
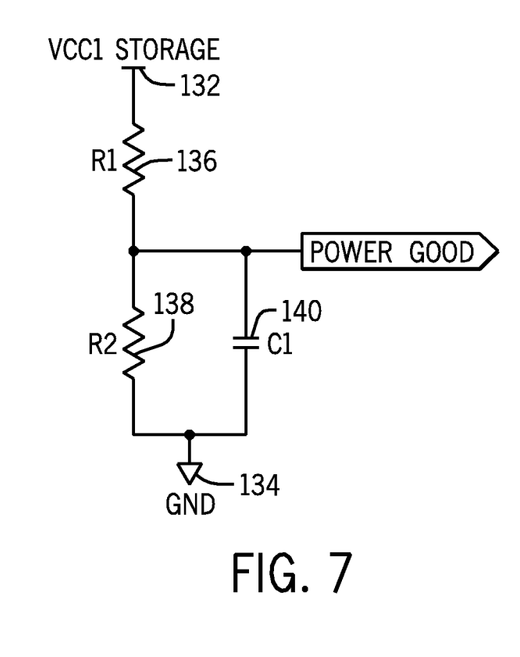
FIG. 7 is an example embodiment of a power good circuit included within the smart power meter system of FIG. 2.

Similarly, FIG. 7 illustrates one embodiment of the power good circuit 68. As illustrated, the power good circuit 68 may include power supply rails (e.g., VCCI STORAGE 132) and a ground terminal (e.g., GND 134), and resistors 136 and 138 electrically coupled to a capacitor 140 (e.g., C1). As previously discussed, the power good circuit 68 may be configured to track the voltage and/or energy level of the charge circuit 66, and to provide a power good signal (e.g., power good signal 106) indicating to the application processor 48 that the metering system 30 has sufficient stored energy to complete a utility data save cycle. The resistors 136 and 138 may be configured in a divider network to divide or step down the supply voltage (e.g., 5-16 VDC) to a lower power good signal voltage (e.g., 3.3 VDC) to transmit, for example, to the application processor 48.

Technical effects of embodiments include a smart meter configured to operate in one or more of a power up mode and power down mode to prevent potential data corruption of saved utility data. Particularly, in the power up mode, the level of storage energy of an auxiliary charge circuit is monitored to ensure, before attempting a utility data save cycle, that the meter has sufficient energy to complete an uninterrupted save. Should the level of storage energy decrease below a predetermined threshold, the meter enters the power down mode, and performs an emergency incremental save of the utility data to be compiled with the last completed save cycle upon the next power up (e.g., energizing) of the meter.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A utility meter comprising:
    an energy storage device configured to store energy to run the utility meter after a primary source of energy to the utility meter is unable to provide sufficient energy to run the utility meter;
    a processor configured to:
        sample a current and a voltage using the utility meter;
        compute a real power and reactive power consumption based on the sampled current and voltage to determine utility usage data associated with a utility consumer;
        monitor an energy level of the energy storage device, the monitoring comprising determining the energy level of the energy storage device is above a first predetermined threshold, wherein the first predetermined threshold corresponds to an amount of energy to save a complete set of the utility usage data and a reduced set of the utility usage data;
        save the complete set of the utility usage data incrementally and periodically when the energy level of the energy storage device is above the first predetermined threshold; and
        save the reduced set of the utility usage data when the energy level of the energy storage device falls below a second predefined threshold, wherein the second predefined threshold corresponds to an amount of energy for a single save of the reduced set of the utility usage data; and
    at least one data storage device configured to store the complete set of the utility usage data, the reduced set of the utility usage data, or both,
    wherein the reduced set of utility usage data is combined with a previously saved complete set of utility usage data to substantially reconstruct the utility usage data, which occurs in response to determining the energy level of the energy storage device is above the first predetermined threshold during a next power-up sequence of the energy storage device.

2. The utility meter of claim 1, wherein the energy storage device is configured to supply the energy to run the utility meter for a time sufficient to enable the processor to save the reduced set of the utility usage data but not to enable the processor to save all of the utility usage data.

3. The utility meter of claim 1, wherein the energy storage device comprises an energy storage device other than a battery.

4. The utility meter of claim 1, wherein the processor is configured to receive a power good signal as an indication of the energy level of the energy storage device.

5. The utility meter of claim 1, wherein the energy storage device is configured to store an amount of energy corresponding to the power required to operate the processor and the at least one data storage device during a single save of the reduced set of the utility usage data.

6. The utility meter of claim 1, wherein the utility usage data is configured to indicate consumption of electric power, gas, or water, or a combination thereof by the utility consumer.

7. The utility meter of claim 1, wherein the processor is configured to save only the reduced set of the utility usage data when the primary source of energy to the utility meter is unable to provide sufficient energy to run the utility meter, and wherein the reduced set of the utility usage data comprises a subset of the utility usage data determined since a prior save, and wherein the reduced set of the utility usage data is configured to enable a substantial reconstruction of the utility usage data based on the reduced set of the utility usage data and the previously saved complete set of utility usage data.

8. The utility meter of claim 7, wherein enabling the substantial reconstruction of the utility usage data based on the reduced set of the utility usage data and the previously saved complete set of utility usage data comprises a prevention of corruption to the utility usage data.

9. The utility meter of claim 1, wherein the at least one data storage device comprises a first memory and a second memory, wherein the first memory is configured to store the utility usage data and the second memory is configured to store the reduced set of the utility usage data.

10. The utility meter of claim 9, wherein the first memory is internal or external to the processor and the second memory is internal or external to the processor.

11. The utility meter of claim 1, wherein the processor is configured to halt performance of any other tasks and save only the reduced set of the utility usage data when the energy level of the energy storage device falls beneath the second predetermined threshold.

12. The utility meter of claim 11, wherein the second predetermined threshold indicates that there is a minimal energy required to complete the save of the reduced set of the utility usage data.

13. The utility meter of claim 1, wherein the utility meter comprises an advanced meter infrastructure (AMI) smart meter.

14. A non-transitory computer-readable medium having code stored thereon executable by a processor, the code comprising instructions to:
    collect utility usage data, the collecting comprising:
        sampling a current and a voltage using the utility meter;
        computing a real power and reactive power consumption based on the sampled current and voltage to determine utility usage data associated with a utility consumer;
    monitor an energy level of an energy storage device, the monitoring comprising determining the energy level of the energy storage device exceeds a first predetermined threshold, wherein the first predetermined threshold correspond to an amount of energy to save a first set of the utility usage data and an incremental set of utility usage data, and wherein the energy storage device is configured to provide energy to operate the processor;

save the first set of the utility usage data incrementally and periodically when the energy level of the energy storage device exceeds the first predetermined threshold; and save the incremental set of the utility usage data when the energy level of the energy storage device falls beneath a second predefined threshold, wherein the second predefined threshold corresponds to an amount of energy for a single save of the incremental set of the utility usage data, and wherein the incremental set of the utility usage data comprises a reduced set of the utility usage data, and wherein the incremental set of the utility usage data is configured to enable a reconstruction of the utility usage data by combining the saved incremental set and the saved first set of the utility usage data, which occurs in response to determining the energy level of the energy storage device exceeds the first predefined threshold during a next power-up sequence of the energy storage device.

15. The computer-readable medium of claim 14, wherein the instructions to monitor the energy level of the energy storage device comprise instructions to monitor a voltage level associated with the energy storage device, wherein the voltage level is configured to indicate an amount of energy that can be extracted from the energy storage device.

16. The computer-readable medium of claim 14, wherein the code comprises instructions to first save the incremental set of the utility usage data before saving the first set of the utility usage data when the energy level exceeds the first threshold.

17. A method comprising:

receiving utility usage data in a utility meter, the receiving comprising:

sampling a current and a voltage using the utility meter;

computing a real power and reactive power consumption based on the sampled current and voltage to determine utility usage data associated with a utility consumer;

monitoring an energy level of an energy storage device using the utility meter, the monitoring comprising determining the energy level of the energy storage device is above a first predetermined threshold, wherein the first predetermined threshold corresponds to an amount of energy to save a more detailed set of the utility usage data and a less detailed set of utility usage data, and wherein the energy storage device is configured to provide energy to operate at least some components of the utility meter; and operating the utility meter in a power up mode when the energy level of the energy storage device is above the first predefined threshold and operating the utility meter in a power down mode when the energy level of the energy storage device is below a second predefined threshold, wherein the second predefined threshold corresponds to an amount of energy for a single save of the less detailed set of the utility usage data wherein:

operating the utility meter in the power up mode comprises occasionally performing an incremental save of the more detailed set of the utility usage data; and operating the utility meter in the power down mode comprises performing an incremental save of the less detailed set of the utility usage data substantially immediately after the energy level of the energy storage device falls below the second predefined threshold; and the less detailed set of the utility usage data is configured to enable a reconstruction of the utility usage data by combining a saved more detailed set of utility usage data and the less detailed set of the utility usage data, the reconstruction occurring in response to determining the energy level of the energy storage device exceeds the first predefined threshold during a second power-up sequence of the energy storage device.

18. The method of claim 17, wherein occasionally performing the incremental save of the more detailed set of the utility data comprises periodically performing the incremental save of the more detailed set of the utility data, wherein the period is short enough to permit the less detailed set of the utility data saved in the power down mode to capture enough of the utility data that a reconstruction can be made using a combination of the less detailed set of the utility data and a most recent prior incremental save of the more detailed set of the utility data.

19. The method of claim 17, further comprising, reconstructing utility data from a most recent incremental save of the more detailed set of the utility data and a most recent incremental save of the less detailed set of the utility data, when the utility meter stops operating in the power down mode and begins operating again in the power up mode.

* * * * *